(12) United States Patent
Murai et al.

(10) Patent No.: US 8,843,294 B2
(45) Date of Patent: Sep. 23, 2014

(54) APPARATUS FOR AND METHOD OF CONTROLLING VARIABLE VALVE TIMING MECHANISM

(75) Inventors: Atsushi Murai, Isesaki (JP); Tomoyuki Murakami, Isesaki (JP); Yoshitatsu Nakamura, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 374 days.

(21) Appl. No.: 13/237,385

(22) Filed: Sep. 20, 2011

(65) Prior Publication Data

US 2012/0067309 A1 Mar. 22, 2012

(30) Foreign Application Priority Data

Sep. 21, 2010 (JP) ................................. 2010-210923

(51) Int. Cl.
  *G06F 17/00* (2006.01)
  *F01L 1/34* (2006.01)
  *F02D 13/02* (2006.01)
  *F01L 1/18* (2006.01)
  *F01L 13/00* (2006.01)
  *F02N 11/08* (2006.01)
  *F02D 41/04* (2006.01)
  *F01L 1/344* (2006.01)
  *F02D 41/06* (2006.01)

(52) U.S. Cl.
  CPC ......... *F02D 13/0265* (2013.01); *F02N 11/0814* (2013.01); *Y02T 10/18* (2013.01); *F02D 13/0238* (2013.01); *F01L 2800/01* (2013.01); *F02D 41/042* (2013.01); *F02D 2200/023* (2013.01); *F01L 1/18* (2013.01); *F01L 2001/186* (2013.01); *F01L 2001/34453* (2013.01); *F02D 2200/1015* (2013.01); *F01L 1/34* (2013.01); *F02D 13/0226* (2013.01); *F01L 13/0036* (2013.01); *F02D 2200/0414* (2013.01); *F02D 41/065* (2013.01)
  USPC ........................ 701/102; 123/90.1; 123/90.15

(58) Field of Classification Search
  USPC .......................... 701/102–105, 110, 112, 113; 123/179.3, 179.4, 179.18, 179.25, 123/179.28, 90.1, 90.11, 90.15, 345–348, 123/406.53, 406.55
  See application file for complete search history.

(56) References Cited

U.S. PATENT DOCUMENTS 5,161,497 A * 11/1992 Simko et al. ............... 123/90.15
6,705,257 B2   3/2004 Shimizu
(Continued)

FOREIGN PATENT DOCUMENTS

JP   2002-161768 A   6/2002
JP   2004-353501 A   12/2004
(Continued)

*Primary Examiner* — John Kwon
*Assistant Examiner* — Johnny H Hoang
(74) *Attorney, Agent, or Firm* — Foley & Lardner LLP

(57) ABSTRACT

The present invention relates to an apparatus for and a method of controlling a variable valve timing mechanism. The valve timing mechanism changes over between a first cam for which the closing timing IVC of the intake valve is after intake bottom dead center, and a second cam for which the closing timing IVC is closer to intake bottom dead center than the closing timing IVC with the first cam. Here at the time of stopping the internal combustion engine, the valve timing mechanism changes over to the first cam, and the initial intake stroke performs operation at low effective compression ratio. In the second and subsequent intake strokes, the valve timing mechanism changes from the first cam to the second cam.

20 Claims, 10 Drawing Sheets

(56) References Cited

U.S. PATENT DOCUMENTS

| | | | |
|---|---|---|---|
| 7,191,746 B2 * | 3/2007 | Nakamura | 123/179.3 |
| 7,373,238 B2 * | 5/2008 | Hakariya et al. | 701/103 |
| 7,603,223 B2 * | 10/2009 | Moriya | 701/103 |
| 7,703,424 B2 * | 4/2010 | Nakamura et al. | 123/90.16 |
| 7,789,051 B2 | 9/2010 | Nakamura | |
| 8,229,652 B2 * | 7/2012 | Natsui et al. | 701/105 |
| 2002/0062799 A1 * | 5/2002 | Murata et al. | 123/90.15 |
| 2002/0062801 A1 | 5/2002 | Shimizu | |
| 2002/0166536 A1 * | 11/2002 | Hitomi et al. | 123/305 |
| 2008/0011253 A1 | 1/2008 | Nakamura | |
| 2008/0168959 A1 * | 7/2008 | Katayama et al. | 123/179.3 |
| 2008/0215228 A1 * | 9/2008 | Krebber-Hortmann | 701/103 |
| 2009/0216427 A1 * | 8/2009 | Yamakawa et al. | 701/103 |
| 2010/0139591 A1 | 6/2010 | Nakamura | |
| 2010/0175644 A1 * | 7/2010 | Shinagawa et al. | 123/90.15 |
| 2010/0235067 A1 * | 9/2010 | Nomura et al. | 701/103 |
| 2010/0236523 A1 * | 9/2010 | Saruwatari et al. | 123/436 |

FOREIGN PATENT DOCUMENTS

| | | |
|---|---|---|
| JP | 2007-113435 A | 5/2007 |
| JP | 2008-019756 A | 1/2008 |
| JP | 2010-077813 A | 4/2010 |
| JP | 2010-138737 A | 6/2010 |

* cited by examiner

IVC: ABDC60deg~ABDC110deg

IVC: BDC~ABDC30deg

APPARATUS FOR AND METHOD OF CONTROLLING VARIABLE VALVE TIMING MECHANISM

BACKGROUND OF THE INVENTION

1. Field of the Invention

The present invention relates to an apparatus for and a method of controlling a variable valve timing mechanism that changes the closing timing of an intake valve of an internal combustion engine.

2. Description of Related Art

Japanese Laid-open Patent Publication No. 2010-138737 discloses a controller of a variable operating angle mechanism capable of changing an operating angle of an intake valve. The controller controls the operating angle of the intake valve before startup of the internal combustion engine, so that the closing timing of the intake valve becomes after piston bottom dead center. Then in a startup state from input of a command signal for starting up the internal combustion engine until combustion starts, if the temperature of the internal combustion engine is lower than a threshold, the operating angle of the intake valve is made smaller that before startup, so that the closing timing of the intake valve approaches piston bottom dead center.

In the control by the controller, completion timing of the control for causing the closing timing of the intake valve to approach piston bottom dead center is after rotation of a starter motor, in other words, after cranking rotation is stabilized.

Incidentally, in a state with the closing timing of the intake valve being largely retarded after piston bottom dead center, that is, in a decompressed state, the effective compression ratio is low, and pre-ignition can be suppressed and vibratory force can be decreased. However, if the effective compression ratio is low, the combustion torque of the internal combustion engine decreases, and hence, the rise in engine speed in the cranking state becomes slow, and cranking time increases.

Consequently, in the control by the controller in which completion timing of the control for causing the closing timing of the intake valve to approach piston bottom dead center is retarded, power consumption at the time of startup of the internal combustion engine is increased.

SUMMARY OF THE INVENTION

It is therefore an object of the present invention to provide an apparatus for and a method of controlling a variable valve timing mechanism that can decrease power consumption, while suppressing pre-ignition and decreasing vibratory force at the time of startup of the internal combustion engine.

To achieve the above object, the apparatus for controlling a variable valve timing mechanism according to the present invention controls the closing timing of an intake valve in an intake stroke of a cylinder which goes into the intake stroke first out of all cylinders at the time of startup of the internal combustion engine, to a first closing timing on a retardation side from an intake bottom dead center, and changes the closing timing of the intake valve to a second closing timing closer to intake bottom dead center than the first closing timing, from after startup of the internal combustion engine until the closing timing of the intake valve in an intake stroke of a cylinder corresponding to a second intake stroke.

Moreover, the method of controlling a variable valve timing mechanism according to the present invention includes: a step of controlling closing timing of the intake valve in an intake stroke of a cylinder which goes into the intake stroke first out of all cylinders at the time of startup of the internal combustion engine, to a first closing timing on a retardation side from an intake bottom dead center; and a step of changing the closing timing of the intake valve to a second closing timing closer to intake bottom dead center than the first closing timing, from after startup of the internal combustion engine until the closing timing of the intake valve in an intake stroke of a cylinder corresponding to a second intake stroke.

The other objects and features of this invention will become understood from the following description with reference to the accompanying drawings.

DESCRIPTION OF THE PREFERRED EMBODIMENTS

Figure 1:
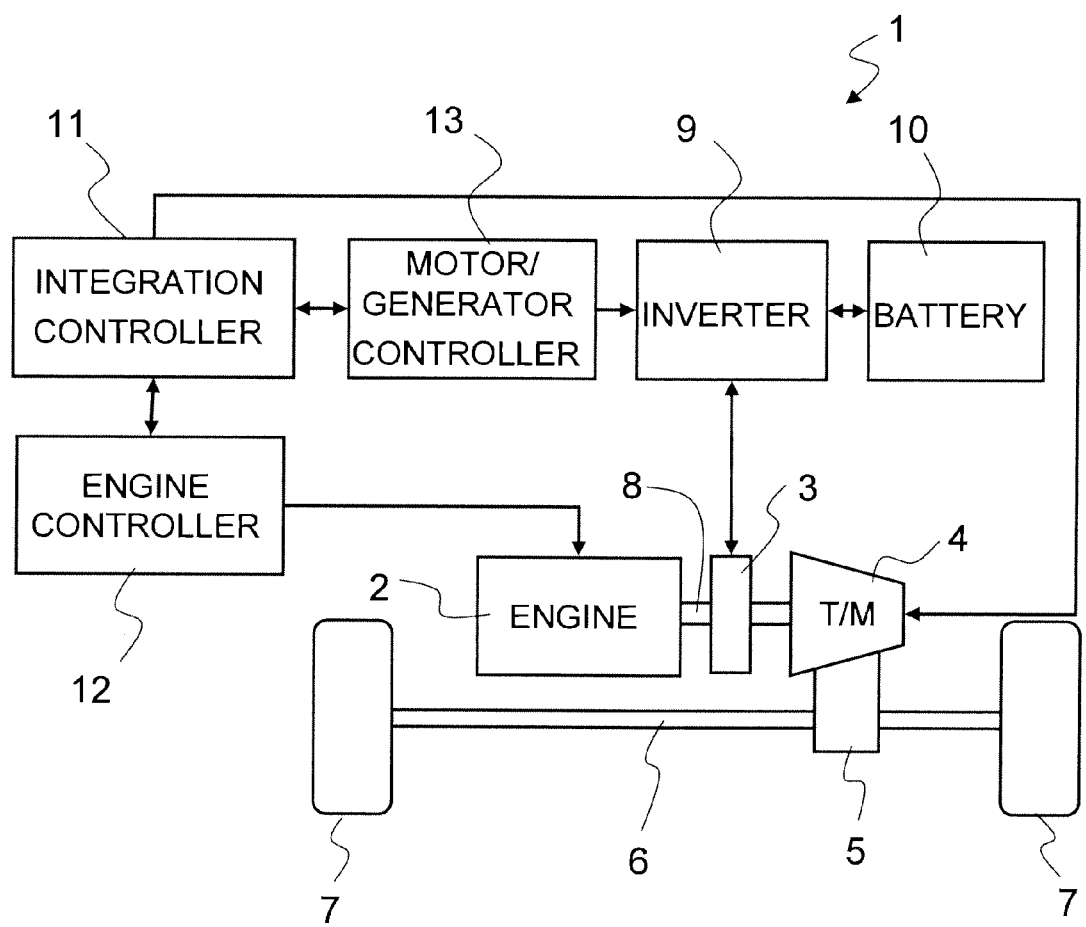
FIG. 1 is an overall configuration diagram of a hybrid vehicle in an embodiment of the present invention.

A hybrid vehicle 1 shown in FIG. 1 includes two power sources, that is, an internal combustion engine 2, which employs the apparatus for and method of controlling a variable valve timing mechanism according to the present invention, and an electric motor 3, which is an AC motor.

A driving force of internal combustion engine 2 is transmitted to drive wheels 7 via a transmission 4, a differential gear 5, and an axle 6.

A rotor of electric motor 3 is directly connected to an output shaft 8 between internal combustion engine 2 and transmission 4. Alternatively, output shaft 8 and the rotor of electric motor 3 may be connected via a power transmission mechanism such as a gear.

Electric motor 3 is a motor/generator. When being operated as an electric motor, electric motor 3 outputs a driving force for vehicle 1. Moreover, electric motor 3 is rotated by internal combustion engine 2 or drive wheels 7, thereby operating as an electric generator and outputting power.

An inverter 9 converts DC power stored in a battery 10 into AC power and supplies it to electric motor 3. Moreover at the time of regenerative braking or power generation, inverter 9 converts AC power output by electric motor 3 into DC power, which is then stored in battery 10.

An integration controller 11 receives input of signals of various sensors that detect driving conditions of the vehicle, and various switches, and determines an operation mode based on the signals, and calculates and outputs a torque command of internal combustion engine 2, and a torque command of electric motor 3.

A key switch, an accelerator opening sensor, a brake switch, a vehicle speed sensor, a battery voltage sensor, and the like are provided as the various sensors and switches, which output signals to integration controller 11.

Furthermore integration controller 11 equipped with a microcomputer, outputs an operation command such as the operation mode and the torque command to an engine controller 12 that controls internal combustion engine 2, and a motor/generator controller 13 that controls electric motor 3.

Integration controller 11, engine controller 12, and motor/generator controller 13 are constituted so as to be communicable with each other. Motor/generator controller 13 generates and outputs a PWM signal for controlling inverter 9 based on the operation command transmitted from integration controller 11 and pieces of information such as the revolutions and current of electric motor 3.

Figure 2:
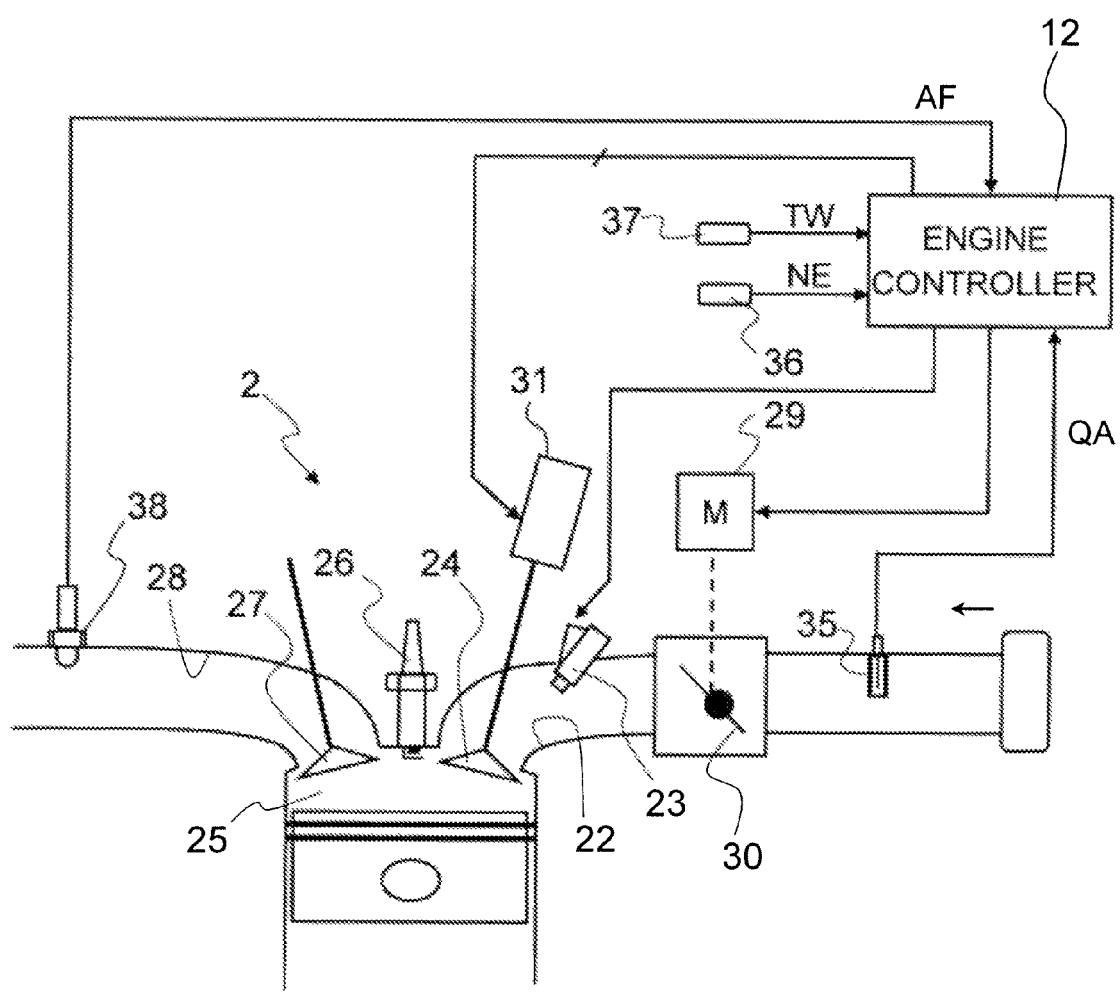
FIG. 2 is a configuration diagram of an engine in the embodiment of the present invention.

FIG. 2 shows the configuration of internal combustion engine 2.

A fuel injection valve 23 is provided in an intake passage 22 of internal combustion engine 2. Fuel injected from fuel injection valve 23 is sucked into a combustion chamber 25 together with air via an intake valve 24, and is ignited and combusted by means of spark ignition by a spark plug 26. Combustion gas in combustion chamber 25 is discharged to an exhaust passage 28 via an exhaust valve 27.

An electronically-controlled throttle 30, which is opened and closed by a throttle motor 29, is provided on an upstream side from a part of intake passage 22 where fuel injection valve 23 is arranged, and an intake air flow quantity of engine 2 is adjusted by the opening of electronically-controlled throttle 30.

Moreover internal combustion engine 2 includes a variable valve timing mechanism 31 that changes an operating angle of intake valve 24 to change the intake valve opening timing IVO and the intake valve closing timing IVC. The operating angle of intake valve 24 is a crank angle from the intake valve opening timing IVO to the intake valve closing timing IVC.

Variable valve timing mechanism 31 is a well-known mechanism, for example, as disclosed in Japanese Laid-open Patent Publication No. 2007-113435, in which two types of cams having different cam profiles are provided on a cam shaft to change over a rocker arm adjacent to the cams, thereby changing over between two types of opening characteristics of an engine valve. Changeover of the rocker arm is performed by rotating a control shaft by a motor.

Figure 3:
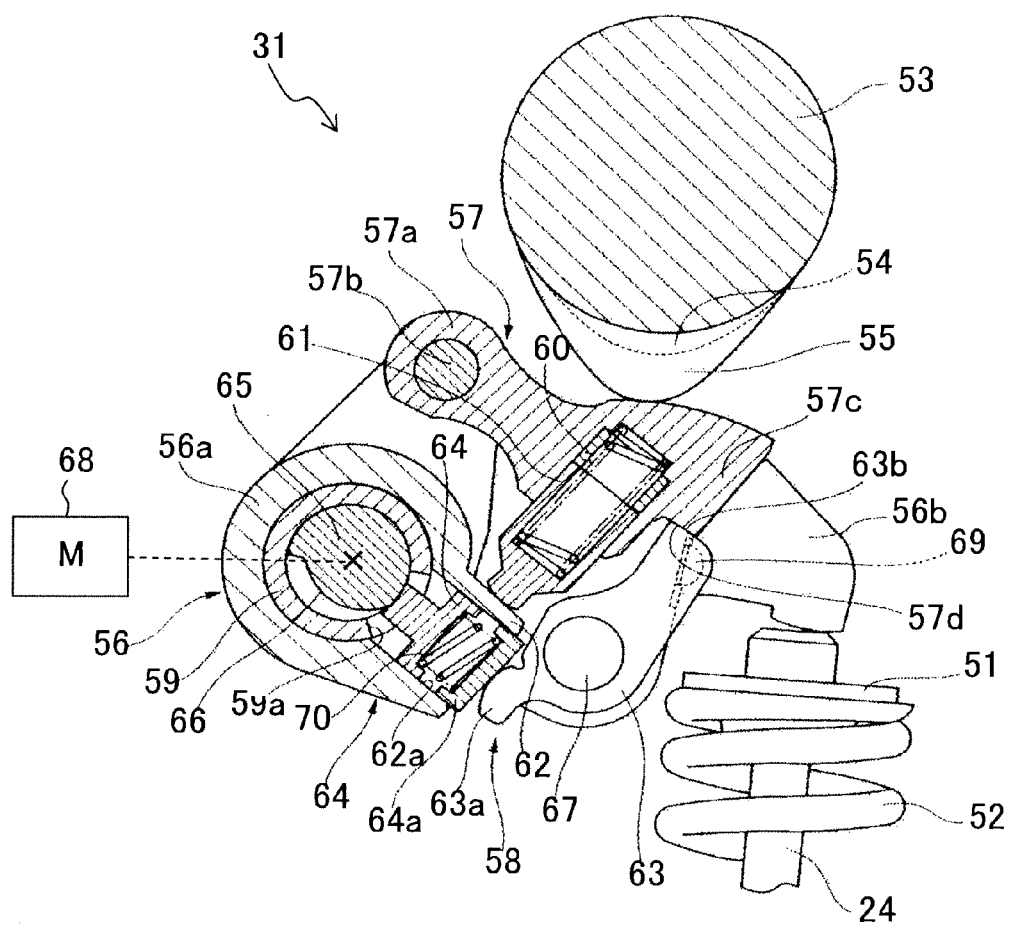
FIG. 3 is a sectional view of a variable valve timing mechanism in the embodiment of the present invention.

The structure of variable valve timing mechanism 31 is shown in FIG. 3.

Intake valve 24 is urged in a direction to block an intake port (not shown), by a valve spring 52 serving as an urging member which is elastically held respectively by spring retainers 51 provided at each stem end.

A small operating angle cam 54 and a large operating angle cam 55 are provided on an outer circumference of a cam shaft 53 corresponding to each intake valve 24.

Variable valve timing mechanism 31 includes a main rocker arm 56 which abuts on an outer circumference of small operating angle cam 54, a sub-rocker arm 57 swingably supported adjacent to main rocker arm 56, and a coupling mechanism 58 that couples sub-rocker arm 57 to main rocker arm 56.

Figure 4A:
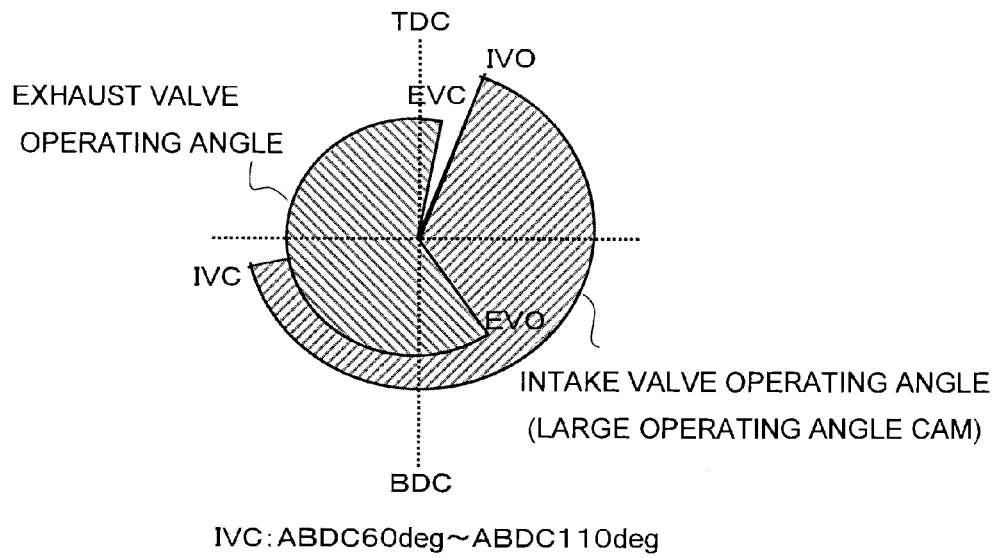
FIG. 4 is a diagram showing characteristics of the variable valve timing mechanism in the embodiment of the present invention.
Figure 4B:
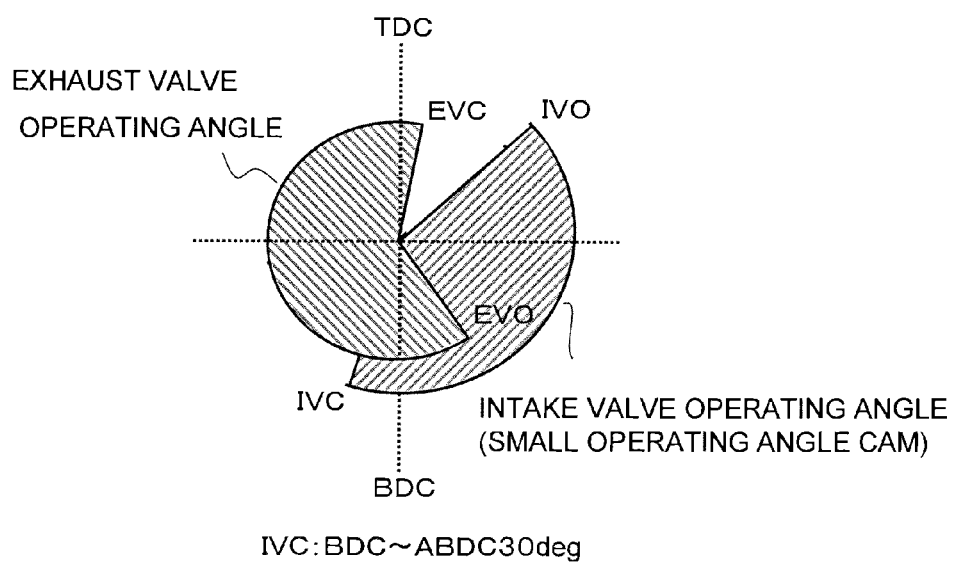

As shown in FIG. 4B, small operating angle cam 54 is set to a cam profile in which the intake valve opening timing IVO of intake valve 24 is from approximately 10 degrees to 60 degrees after intake top dead center TDC, and the intake valve closing timing IVC of intake valve 24 is from intake bottom dead center BDC to approximately 30 degrees after intake bottom dead center BDC. It is desired that the intake valve closing timing IVC of intake valve 24 by small operating angle cam 54 is set to intake bottom dead center BDC.

When the intake valve closing timing IVC of intake valve 24 is set to intake bottom dead center BDC, the effective compression ratio becomes a maximum. Consequently, if intake valve 24 is driven by using small operating angle cam 54 and is closed near intake bottom dead center BDC, a large combustion torque can be obtained by the high effective compression ratio.

On the other hand, as shown in FIG. 4A, large operating angle cam 55 is set to a cam profile in which the intake valve opening timing IVO of intake valve 24 is from intake top dead center TDC to approximately 30 degrees after intake top dead center TDC, and the intake valve closing timing IVC of intake valve 24 is from approximately 60 degrees after intake bottom dead center BDC to approximately 110 degrees after intake bottom dead center BDC.

It is desired that the intake valve closing timing IVC by large operating angle cam 55 is set to approximately 90 degrees after intake bottom dead center BDC.

The intake valve opening timing IVO and the intake valve closing timing IVC by small operating angle cam 54 and large operating angle cam 55 are not limited to the setting described above, and it is only required that the first intake valve closing timing IVC by large operating angle cam 55 is set after intake bottom dead center, and the second intake valve closing timing IVC by small operating angle cam 54 is set closer to intake bottom dead center than the intake valve closing timing IVC by large operating angle cam 55.

Whereas the cam profile of small operating angle cam 54 is set, assuming usage in a normal operation state of internal combustion engine 2, large operating angle cam 55 is used for decreasing the effective compression ratio at the time of startup of internal combustion engine 2 as described below. Moreover the first intake valve closing timing IVC by large operating angle cam 55 is retarded to after intake bottom dead center and after the second intake valve closing timing IVC by small operating angle cam 54, thereby enabling to decrease the effective compression ratio more than for the case of using small operating angle cam 54.

In other words, if a state in which intake valve 24 is driven by using large operating angle cam 55 is changed over to a state in which intake valve 24 is driven by using small operating angle cam 54, the intake valve closing timing IVC of intake valve 24 is advanced from after intake bottom dead center to approach intake bottom dead center, and the effective compression ratio is changed over to a larger value.

As described above, the operating angle of intake valve 24 increases at the time of being driven by large operating angle cam 55 more than for the case of being driven by small operating angle cam 54. Moreover the intake valve closing timing IVC of intake valve 24 is set near bottom dead center BDC, by small operating angle cam 54. Furthermore when intake valve 24 is driven by large operating angle cam 55, the intake valve closing timing IVC of intake valve 24 is retarded to after bottom dead center BDC. In the case in which intake valve 24 is driven by large operating angle cam 55, it is set such that the effective compression ratio decreases more than for the case of driving intake valve 24 by small operating angle cam 54.

In main rocker arm 56, a base end 56a is swingably supported by the cylinder head via a hollow main rocker shaft 59 common to respective cylinders, and an end of an arm 56b abuts on the top of a stem of intake valve 24.

In sub-rocker arm 57, a base end 57a is relatively and swingably supported on base end 56a side of main rocker arm 56 via a sub-rocker shaft 57b, and sub-rocker arm 57 does not have a part in contact with intake valve 24. On the tip end of sub-rocker arm 57, a cam follower 57c serving as a sub-cam follower with an upper face thereof slidably contacting with large operating angle cam 55, is formed protruding in a circular arc shape.

A coil spring 60, which pushes cam follower 57c to large operating angle cam 55, is arranged on an underside of cam follower 57c. The coil spring 60 elastically contacts with an upper face of a protrusion 62 formed on base end 56a of main rocker arm 56, via a spring retainer 61.

Coupling mechanism 58 includes; a lever member 63 that couples main rocker arm 56 to sub-rocker arm 57, a plunger 64 slidably provided in a sliding hole 62a provided in the protrusion 62 with one end thereof abutting on a lower end protrusion 63a of lever member 63, a control shaft 65 rotatably provided in main rocker shaft 59, and a control cam 66 formed integral with an outer circumference of control shaft 65 and abutting on the other end of plunger 64 via a notch window 59a of main rocker shaft 59.

Lever member 63 is swingably supported toward sub-rocker arm 57 via a spindle 67, and is changed over between a state in which an upper end face 63b engages with an engaging surface 57d provided on an underside of the end of cam follower 57c, and a state in which the engagement is released, according to a swinging position.

Moreover lever member 63 is urged by an urging mechanism 69 in a direction of releasing the engagement with cam follower 57c.

Plunger 64 is axially halved substantially at a central position. A lower face of one end portion 64a of plunger 64 abuts on lower end protrusion 63a of lever member 63, and an end of a small-diameter cylinder provided on an other end portion 64b abuts on control cam 66.

Moreover a spring member 70 in a coil spring shape of a damping mechanism is provided between opposite end faces of one end portion 64a and other end portion 64b. Spring member 70 is formed with a spring force set larger than that of urging mechanism 69 so as not to affect responsiveness at the time of a coupling operation of main rocker arm 56 and sub-rocker arm 57.

A rotation force in a clockwise direction and a counter-clockwise direction is transmitted to control shaft 65 from a DC electric motor 68 serving as an electric actuator, via a reduction gear mechanism (not shown).

Control cam 66 is formed to become shallow gradually from a maximum depth notched portion. When control cam 66 rotates and plunger 64 abuts on the deepest portion thereof, plunger 64 is pulled toward the control shaft 65 side, and hence, lever member 63 turns clockwise, and upper end face 63b is separated from engaging surface 57d of cam follower 57c to release the engagement. As a result, the coupling between main rocker arm 56 and sub-rocker arm 57 is released. Consequently, main rocker arm 56 swings according to the cam profile of small operating angle cam 54 to open and close intake valve 24 and decrease the operating angle of intake valve 24, and the intake valve closing timing IVC approaches bottom dead center BDC.

On the other hand, when plunger 64 abuts on the most shallow portion of control cam 66, plunger 64 protrudes in a direction away from control shaft 65, and hence, lever member 63 turns counterclockwise, and upper end face 63b moves in a direction of engaging with engaging surface 57d of cam follower 57c. As a result, main rocker arm 56 and sub-rocker arm 57 are coupled together, and both rocker arms 56 and 57 swing integrally.

Here large operating angle cam 55 is formed so that the operating angle and a maximum valve lift amount of intake valve 24 become larger than those of small operating angle cam 54. Consequently, when main rocker arm 56 and sub-rocker arm 57 are coupled, intake valve 24 is driven according to the cam profile of large operating angle cam 55 having the larger valve lift amount, to increase the operating angle of intake valve 24, and intake valve closing timing IVC is retarded from near bottom dead center BDC.

The timing of engaging upper end face 63b of lever member 63 with engaging surface 57d of cam follower 57c is not in a lift area of large operating angle cam 55, but in a base circle area of large operating angle cam 55.

Thus, in variable valve timing mechanism 31, control shaft 65 is turned by electric motor 68 to change over between engagement and release of lever member 63 and cam follower 57c, to change over between coupling and release of main rocker arm 56 and sub-rocker arm 57, thereby changing over the cam for driving intake valve 24 to either small operating angle cam 54 or large operating angle cam 55, and changing over the operating angle of intake valve 24 and the intake valve opening timing IVO/intake valve closing timing IVC.

Engine controller 12 includes a microcomputer, and controls fuel injection by fuel injection valve 23, ignition by spark plug 26, the opening of electronically-controlled throttle 30, and a change in opening characteristics of intake valve 24 by variable valve timing mechanism 31. That is to say, in the present embodiment, engine controller 12 corresponds to the apparatus for controlling the variable valve timing mechanism.

However, a variable valve controller that performs drive control of variable valve timing mechanism 31 can be provided separate to engine controller 12. Moreover, engine controller 12 can calculate a target value of variable valve timing mechanism 31 and output the target value to the variable valve controller, and perform feedback control of a manipulated variable of variable valve timing mechanism 31 based on the target value and a controlled variable.

Furthermore, engine controller 12 inputs detection signals from an air flow sensor 35 that detects an intake air flow quantity QA of internal combustion engine 2, a rotation sensor 36 that detects rotation speed NE (rpm) of internal combustion engine 2, a water temperature sensor 37 that detects coolant temperature TW of internal combustion engine 2, and an air-fuel ratio sensor 38 that detects air-fuel ratio AF based on the oxygen concentration in exhaust air. Furthermore, engine controller 12 inputs operation commands such as the operation mode and the torque command transmitted from integration controller 11.

The coolant temperature TW of internal combustion engine 2 is a parameter representing engine temperature.

Furthermore engine controller 12 controls the operation and shutdown of internal combustion engine 2 according to the operation mode, and also controls the opening of electronically-controlled throttle 30 according to the torque command, thereby adjusting the intake air flow quantity of internal combustion engine 2, and eventually, the output torque of internal combustion engine 2.

Moreover, engine controller 12 calculates an injection pulse width TI based on the intake air flow quantity QA, the engine speed NE, the coolant temperature TW, and the air-fuel ratio AF, and individually outputs an injection pulse signal of the calculated injection pulse width TI to each fuel injection valve 23, matched with the stroke of each cylinder.

Furthermore, engine controller 12 calculates ignition timing based on engine load, engine speed NE, coolant temperature TW, and startup state, and controls the ignition operation by spark plug 26 according to the ignition timing.

Figure 5:
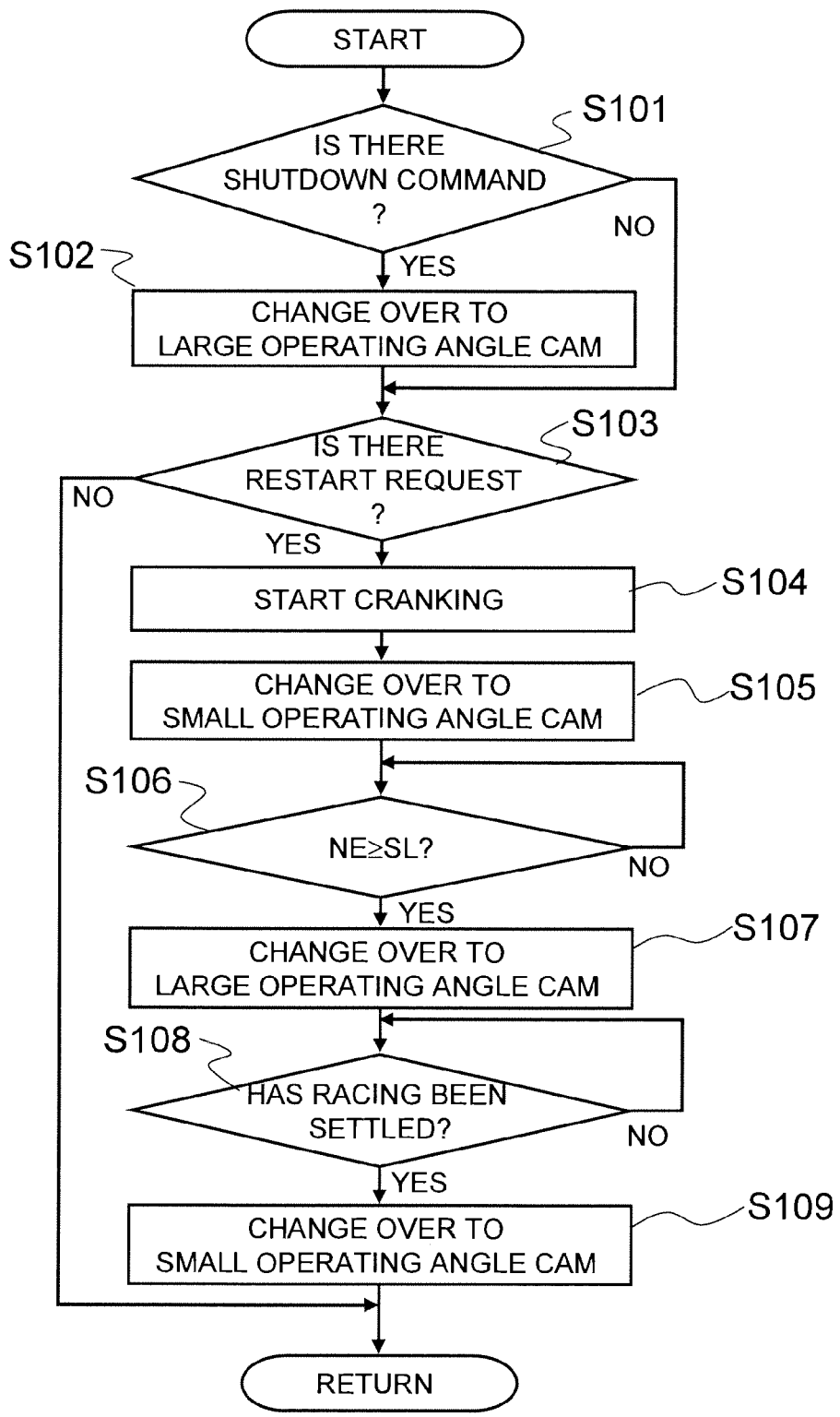
FIG. 5 is a flowchart showing control of valve timing at the time of startup in the embodiment of the present invention.

Here, control of variable valve timing mechanism 31 by engine controller 12 is explained following the flowchart shown in FIG. 5. The routine shown in the flowchart in FIG. 5 is performed at regular time intervals.

At first, in step S101 it is determined whether a shutdown command of internal combustion engine 2 such as an idle reduction request has been generated, based on the operation mode. Then if a shutdown command has been generated, control proceeds to step S102, in which variable valve timing mechanism 31 changes over the cam to be used for driving intake valve 24 to large operating angle cam 55.

Changeover control of the cam at the time of shutdown of internal combustion engine 2 is control for placing in a condition for driving intake valve 24 by large operating angle cam 55 beforehand to prepare for restart. As a result, in the intake stroke of the cylinder which goes into the intake stroke first out of all cylinders, intake valve 24 is closed at a timing retarded after intake bottom dead center to decrease the effective compression ratio. Moreover a decrease in the effective compression ratio suppresses the occurrence of pre-ignition, reduces vibratory force, and reduces power for startup of internal combustion engine 2.

That is to say, the intake valve closing timing IVC by large operating angle cam 55 is adjusted beforehand so that suppression of the occurrence of pre-ignition, a decrease in the vibratory force, and reduction in power for startup of internal combustion engine 2 can be achieved at the time of startup of internal combustion engine 2, by retarding the intake valve closing timing IVC from bottom dead center at which the effective compression ratio becomes maximum, to decrease the effective compression ratio.

As described above, large operating angle cam 55 is used at the time of startup of internal combustion engine 2, and hence an inertia supercharging effect as in a high rotary area is not generated, and the more the intake valve closing timing IVC of intake valve 24 is retarded from bottom dead center BDC, the more the effective compression ratio is decreased.

In step S102, the cam is changed over from small operating angle cam 54 to large operating angle cam 55, while internal combustion engine 2 is being rotated by inertia from a point of generation of the shutdown command of internal combustion engine 2, thereby changing over the intake valve closing timing IVC of intake valve 24 from near intake bottom dead center BDC to approximately 90 degrees after intake bottom dead center BDC. In other words, in step S102, the intake valve closing timing IVC is retarded so as to be away from intake bottom dead center BDC.

When internal combustion engine 2 is stopped in a state with intake valve 24 being driven by large operating angle cam 55, then in step S103 it is determined if there is a restart request such as an idle reduction release request.

Then if a restart request has been generated, control proceeds to step S104 to start electric motor 3, and the crankshaft of internal combustion engine 2 is rotated by the output of electric motor 3 so that internal combustion engine 2 is cranked, and fuel injection to and ignition of internal combustion engine 2 are started.

When fuel injection is to be started, the first explosion is advanced by performing the first fuel injection to a cylinder which has stopped in the middle of the intake stroke. Thereafter, fuel injection is sequentially performed to cylinders which go into the intake stroke, and ignition energy is supplied to spark plug 26 so as to generate an ignition spark for the cylinder for which fuel injection has been performed.

A starter motor exclusive for engine startup may be provided separate to electric motor 3, so that internal combustion engine 2 can be cranked by the starter motor.

When cranking of internal combustion engine 2 is started, in the intake stroke of the cylinder which goes into the intake stroke first out of all cylinders, in other words, in the first intake stroke, by driving intake valve 24 by the large operating angle cam, which has been changed over beforehand at the time of shutdown of internal combustion engine 2, intake valve 24 is closed at retarded timing after intake bottom dead center BDC.

By using large operating angle cam 55 in the first intake stroke, the intake valve closing timing IVC is retarded from intake bottom dead center BDC more than in the case of using small operating angle cam 54, thereby decreasing the effective compression ratio in the first intake stroke. Consequently, even in a case in which internal combustion engine 2 is restarted in a completely warmed state, such as in a case of restarting internal combustion engine 2 from an idle reduction state, and even under a condition that pre-ignition tends to occur, the occurrence of pre-ignition can be suppressed.

In other words, the intake valve closing timing IVC at which the effective compression ratio becomes low so that the occurrence of pre-ignition can be suppressed is set after bottom dead center BDC, and large operating angle cam 55 is set to a cam profile such that intake valve 24 is closed at the intake valve closing timing IVC.

Moreover, by decreasing the effective compression ratio in the first intake stroke, vibratory force decreases to suppress generation of engine vibration. Furthermore, compression work decreases, thereby enabling to reduce power required for startup of the engine.

In step S105, in the intake stroke of a cylinder which goes into the intake stroke second out of all cylinders, in other words, in the second intake stroke, the cam is changed over to small operating angle cam 54 so that the intake valve closing timing IVC of intake valve 24 is advanced from the intake valve closing timing IVC in the first intake stroke to approach intake bottom dead center BDC. As a result, in the intake stroke of the cylinder which goes into the intake stroke second out of all cylinders, intake valve 24 is driven by using small operating angle cam 54 so that intake valve 24 is closed near intake bottom dead center BDC.

In variable valve timing mechanism 31 used in the present embodiment, as described above, engagement/release of lever member 63 cannot be performed in a state with sub-rocker arm 57 being pushed in the lift area of large operating angle cam 55 and swinging, and engagement/release of lever member 63 can be performed in a state with the base circle area of large operating angle cam 55 abutting on cam follower 57c.

Figure 6:
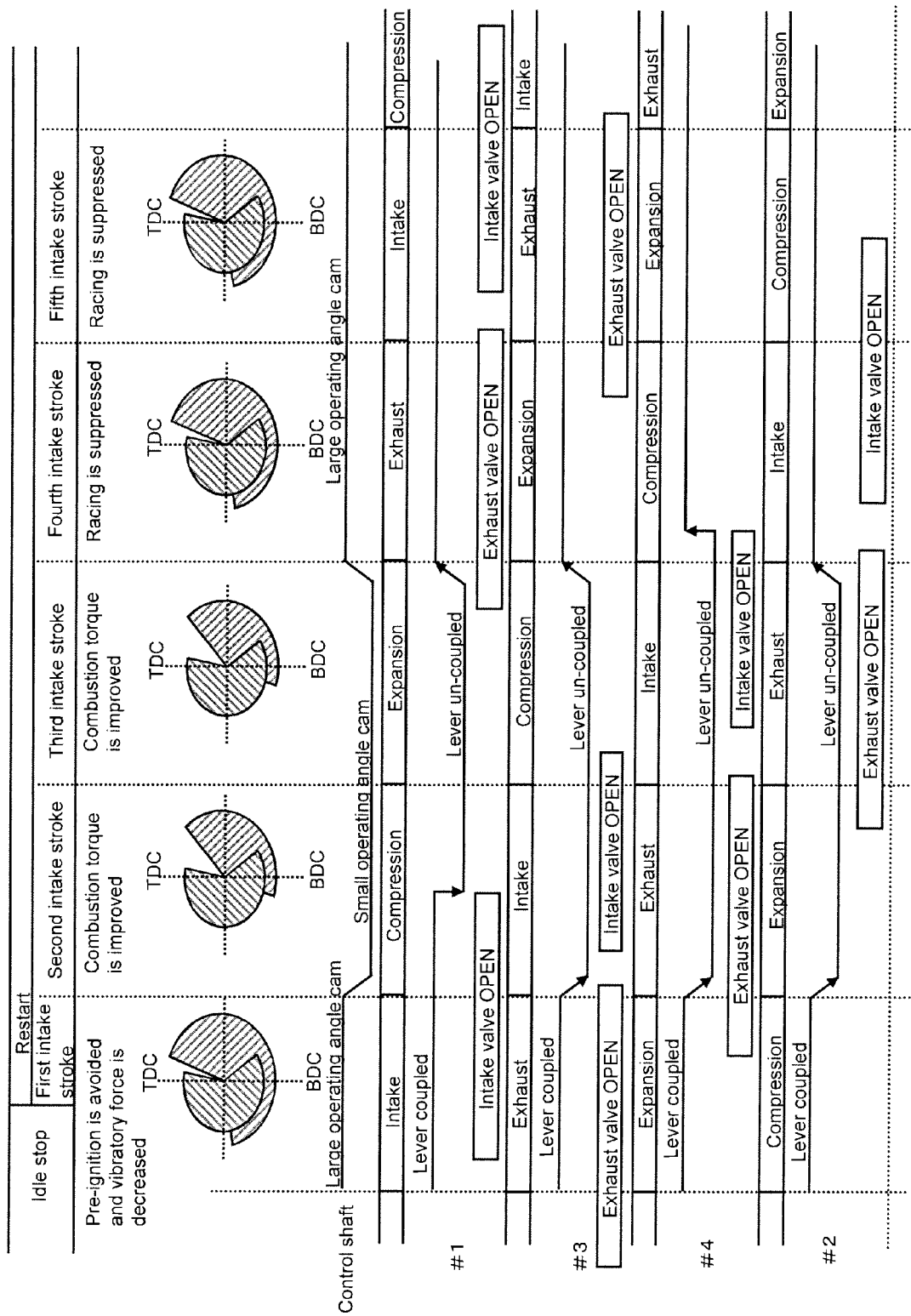
FIG. 6 is a timing chart showing changes in the valve timing at the time of startup in the embodiment of the present invention.

Therefore, as shown in FIG. 6, in the first intake stroke and before start of the second intake stroke, for example, at intake bottom dead center BDC in the first intake stroke, engagement of lever member 63 is released, and the manipulated variable for changing over the cam from large operating angle cam 55 to small operating angle cam 54 is output to variable valve timing mechanism 31.

Even if the operation for changing over to small operating angle cam 54 is performed at intake bottom dead center BDC in the first intake stroke, intake valve 24 is continuously driven by large operating angle cam 55 for the cylinder corresponding to the first intake stroke until reaching the intake valve closing timing IVC, in other words, until a state in which cam follower 57c abuts on the base circle of large operating angle cam 55 in the cylinder corresponding to the first intake stroke. When the first intake stroke has finished, the engagement of lever member 63 is released, switching to the state in which intake valve 24 is driven by small operating angle cam 54.

On the other hand, the cylinder which goes into the intake stroke after intake bottom dead center BDC at which the changeover operation has been performed, is in a state abutting on the base circle of large operating angle cam 55 at the point in time when the changeover operation is performed. Therefore the engagement of lever member 63 is released immediately, switching to a state in which intake valve 24 is driven by small operating angle cam 54.

In the case in which intake valve 24 is driven by small operating angle cam 54, the intake valve closing timing IVC becomes near intake bottom dead center BDC, and hence, the effective compression ratio becomes higher than that at the time of being driven by large operating angle cam 55, and higher combustion torque can be obtained. Consequently, if the cam is changed over from large operating angle cam 55 to small operating angle cam 54, an increase in the rotation speed NE of internal combustion engine 2 can be accelerated, thereby enabling to decrease the startup time, in other words, the time while internal combustion engine 2 is cranked by a rotative driving force of the motor.

Moreover if the startup time of internal combustion engine 2 can be decreased, requirement for battery power required for startup decreases, and relatively, the battery power used for driving by electric motor 3 can be increased and travel distance by electric motor 3 can be increased.

If the cam is changed over from large operating angle cam 55 to small operating angle cam 54 by variable valve timing mechanism 31, then as described above, the increase in the rotation speed is accelerated by an increase in the combustion torque due to an increase in the effective compression ratio. However, if the increase in the rotation speed is accelerated, overshoot of the rotation speed NE may increase.

Therefore in the present embodiment, a process described below is performed in order to suppress overshoot of the engine speed NE.

In step S106 it is determined whether the engine speed NE is equal to or greater than a complete-explosion determination speed SL.

The complete-explosion determination speed SL is a rotation speed at which it can be determined that internal combustion engine 2 can continue rotation independently even if cranking of internal combustion engine 2 by electric motor 3 is stopped, and for example, the complete-explosion determination speed SL is set to approximately 1000 rpm.

If the engine speed NE has reached the complete-explosion determination speed SL, cranking of internal combustion engine 2 by electric motor 3 is not required. Moreover, if small operating angle cam 54 having the high effective compression ratio is continuously used, overshoot with respect to a target idling rotation speed of the engine speed NE may become excessive.

Consequently, when the engine speed NE reaches the complete-explosion determination speed SL in the state with intake valve 24 being driven by small operating angle cam 54, control proceeds to step S107, in which cranking of internal combustion engine 2 by electric motor 3 is stopped, and at that time control shaft 65 is turned so that the cam is changed over to large operating angle cam 55 sequentially from a cylinder in which the base circle area of large operating angle cam 55 abuts on sub-rocker arm 57.

If the cam is changed over from small operating angle cam 54 to large operating angle cam 55, the intake valve closing timing IVC of intake valve 24 is retarded from near intake bottom dead center, and the effective compression ratio decreases to decrease the combustion torque, thereby enabling to suppress racing of engine speed NE.

In step S108 it is determined whether racing of engine speed has been settled by changing over from small operating angle cam 54 to large operating angle cam 55.

Specifically, it is determined that racing of the engine speed NE, which has once increased across the complete-explosion determination speed SL, has been settled; once it starts to decrease in a direction approaching the complete-explosion determination speed SL, once an absolute value of acceleration of the engine speed NE becomes equal to or lower than a threshold, or once a state in which the engine speed is included in a rotation speed area including the target idling rotation speed, has continued for a certain period of time.

When it is determined that racing of the engine speed NE has been settled, control proceeds to step S109, where the cam is changed over from large operating angle cam 55 to small operating angle cam 54, so that internal combustion engine 2 is driven efficiently with a higher effective compression ratio.

The reason why intake valve 24 is driven by using large operating angle cam 55 in the first intake stroke at the time of startup is to suppress the occurrence of pre-ignition by decreasing the effective compression ratio by the drive with large operating angle cam 55. Consequently, when there is no pre-ignition occurrence condition, small operating angle cam 54 can be used from the first intake stroke, thereby enabling to obtain high combustion torque by means of the high effective compression ratio.

Figure 7:
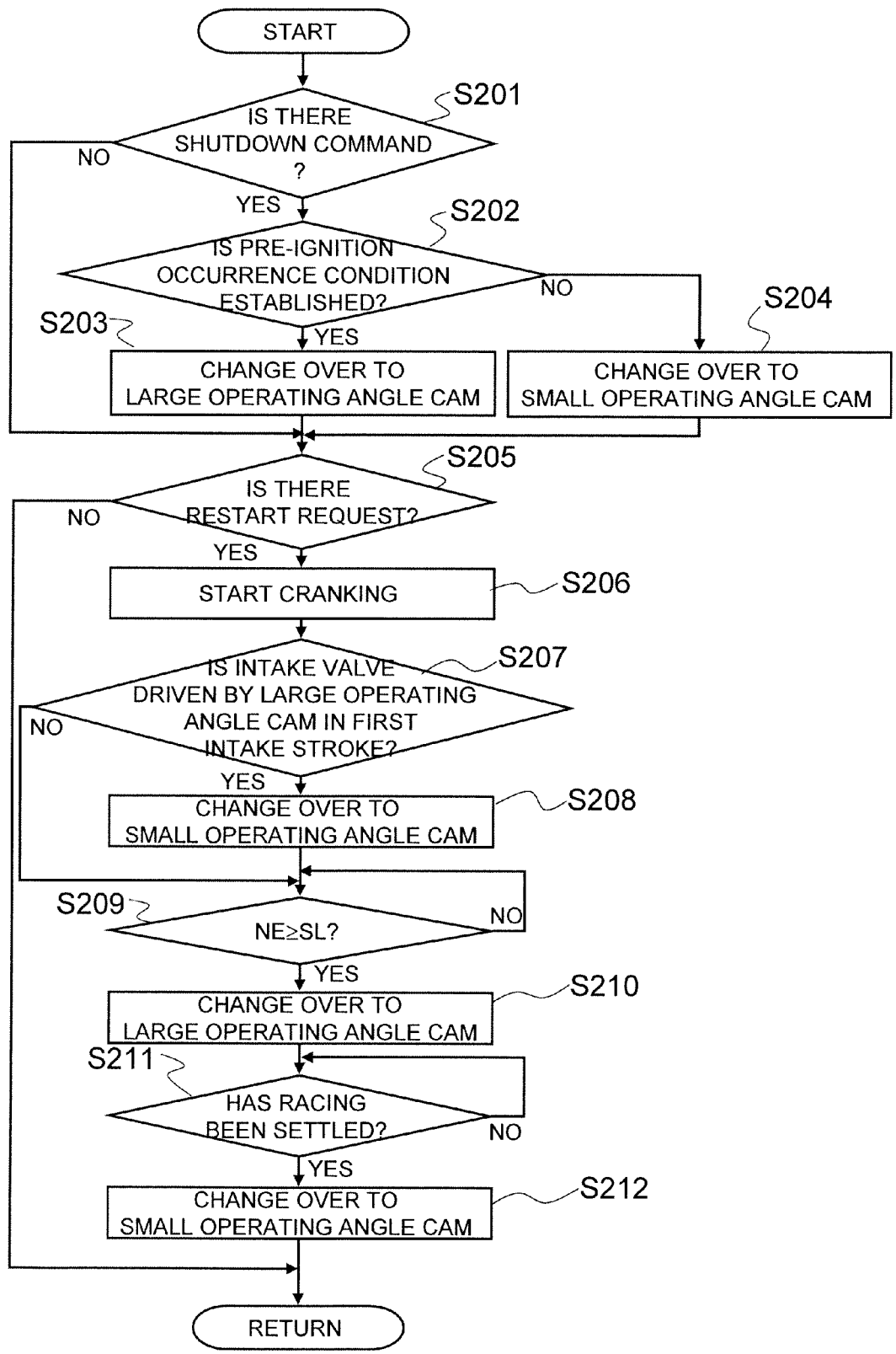
FIG. 7 is a flowchart showing control of the valve timing at the time of startup in the embodiment of the present invention.

Accordingly, in the control of variable valve timing mechanism 31 by means of engine controller 12, shown in the flowchart in FIG. 7, it is determined whether to use large operating angle cam 55 or small operating angle cam 54 in the first intake stroke, based on whether there is a pre-ignition occurrence condition.

The flowchart shown in FIG. 7 is performed at regular time intervals. At first, in step S201, for example, it is determined whether a shutdown command of internal combustion engine 2 such as an idle reduction request has been generated, based on the operation mode. When the shutdown command is generated, control proceeds to step S202, where it is determined whether a pre-ignition occurrence condition has been established.

Specifically, it is determined whether the coolant temperature TW and/or intake temperature at that time is in a high-temperature region in which the occurrence of pre-ignition is predicted. When the coolant temperature TW and/or intake temperature is included in the high-temperature region in which the occurrence of pre-ignition is predicted, it is determined that a pre-ignition occurrence condition is established.

Then in the case in which the pre-ignition occurrence condition is established, control proceeds to step S203, in which variable valve timing mechanism 31 changes over the cam to be used for driving intake valve 24, to large operating angle cam 55 to prepare for restart.

On the other hand, when the pre-ignition occurrence condition is not established, in other words, when it is presumed that pre-ignition does not occur, control proceeds to step S204 to keep the cam to be used for driving intake valve 24 as the small operating angle cam 54.

In step S205 it is determined whether there is a restart request such as an idle reduction release request.

Then if a restart request has been generated, control proceeds to step S206 to start electric motor 3, and the crankshaft of internal combustion engine 2 is rotated by the output of electric motor 3, so that internal combustion engine 2 is cranked, and fuel injection to and ignition of internal combustion engine 2 are started.

Here at the time of shutdown of internal combustion engine 2, in the case in which it is presumed that pre-ignition does not occur at the time of restart, and internal combustion engine 2 is shutdown in a state of using small operating angle cam 54, intake valve 24 is driven by small operating angle cam 54 from the first intake stroke, and combustion can be effected with a high effective compression ratio from the first intake stroke. Therefore the rising response in engine speed NE can be increased.

On the other hand, at the time of shutdown of internal combustion engine 2, if it is presumed that pre-ignition occurs at the time of restart, the cam is changed over to large operating angle cam 55. Therefore intake valve 24 is driven by the large operating angle cam 55 in the first intake stroke, thereby enabling to suppress the occurrence of pre-ignition by means of combustion with a small effective compression ratio.

When the startup operation of internal combustion engine 2 is started, in step S207 it is determined whether the setting is such that intake valve 24 is driven by large operating angle cam 55 or by small operating angle cam 54 in the first intake stroke.

In step S207, when the setting is such that intake valve 24 is driven by large operating angle cam 55 in the first intake stroke, based on the prediction of the occurrence of pre-ignition, control proceeds to step S208.

In step S208, in the intake stroke of the cylinder which goes into the intake stroke second out of all cylinders, in other words, in the second intake stroke, the cam is changed over to small operating angle cam 54 so that the intake valve closing timing IVC of intake valve 24 is advanced from the intake valve closing timing IVC in the first intake stroke to approach intake bottom dead center BDC.

That is to say, in the case in which the occurrence of pre-ignition is predicted, large operating angle cam 55 is used for the first intake stroke to suppress the occurrence of pre-ignition, and small operating angle cam 54 is used from the second intake stroke to increase the engine speed NE quickly by means of combustion with a high effective compression ratio from the second intake stroke and thereafter.

On the other hand, in the case in which it is predicted that pre-ignition does not occur and small operating angle cam 54 is used from the first intake stroke, the engine speed NE can be immediately increased by continuously using small operating angle cam 54 in the second intake stroke and thereafter. Therefore control skips step S208 and proceeds to step S209.

In step S209 it is determined whether the engine speed NE is equal to or greater than the complete explosion determination speed SL in a state with intake valve 24 being driven by using small operating angle cam 54.

Then when the engine speed NE reaches the complete explosion determination speed SL in a state with the high effective compression ratio being obtained by using small operating angle cam 54, control proceeds to step S210 in which cranking of internal combustion engine 2 by electric motor 3 is stopped, and control shaft 65 is turned so as to change over the cam to large operating angle cam 55 sequentially from a cylinder for which the base circle area of large operating angle cam 55 abuts on sub-rocker arm 57.

As described above, racing of the engine speed NE can be suppressed by changing over the cam to large operating angle cam 55 with which the effective compression ratio is decreased.

In step S211 it is determined whether racing of the engine speed NE has been settled by changing over the cam from small operating angle cam 54 to large operating angle cam 55.

Then if determined that racing of the engine speed NE has been settled, control proceeds to step S212 in which the cam is returned from large operating angle cam 55 to small operating angle cam 54 to operate internal combustion engine 2 with a higher effective compression ratio.

As variable valve timing mechanism 31, instead of the mechanism that changes over between small operating angle cam 54 and large operating angle cam 55 described in the above-described embodiment, a mechanism that can continuously change the intake valve closing timing IVC can be used.

Figure 8:
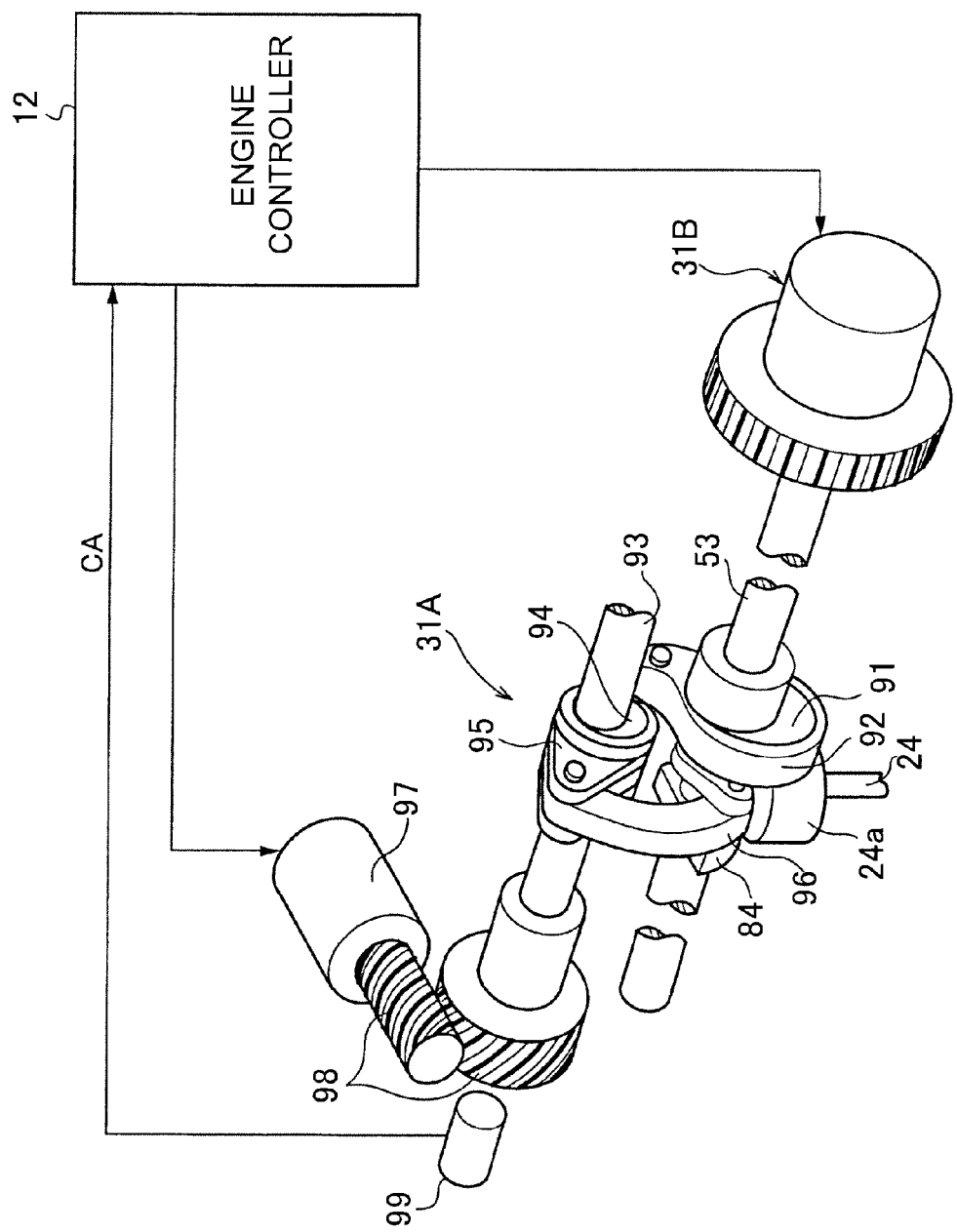
FIG. 8 is a perspective view of the variable valve timing mechanism in the embodiment of the present invention.
Figure 9:
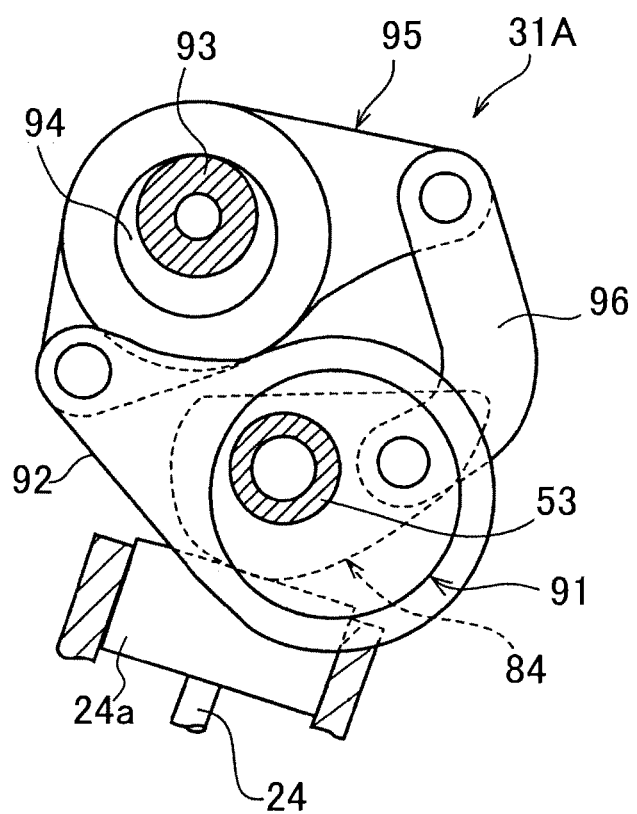
FIG. 9 is a sectional view of the variable valve timing mechanism shown in FIG. 8.

As variable valve timing mechanism 31 that can continuously change the intake valve closing timing IVC, for example, by a structure as shown in FIG. 8 and FIG. 9, a combination of a variable operating angle mechanism 31A that can continuously change a maximum valve lift amount as well as the operating angle, and a center phase variable mechanism 31B that can continuously change a center phase of the operating angle by continuously changing a rotation phase of the cam shaft with respect to the crankshaft can be used.

As shown in FIG. 8, cam shaft 53 rotated by the crankshaft (not shown) is rotatably supported above intake valve 24 along a cylinder row direction.

A swing cam 84 that abuts on a valve lifter 24a of intake valve 24 to open or close intake valve 24, is externally fitted to cam shaft 53 so as to be rotatable relative thereto.

Variable operating angle mechanism 31A that continuously changes the operating angle and the valve lift amount of intake valve 24, is provided between cam shaft 53 and swing cam 84.

Center phase variable mechanism 31B that continuously changes the center phase of the operating angle of intake valve 24 by changing a rotation phase of cam shaft 53 with respect to the crankshaft, is arranged at one end of cam shaft 53.

As shown in FIG. 8 and FIG. 9, variable operating angle mechanism 31A includes, as shown in FIGS. 8 and 9, a circular drive cam 91 eccentrically-clamped to cam shaft 53, a ring-shaped link 92 externally fitted to drive cam 91 so as to be rotatable relative thereto, a control shaft 93 extending substantially parallel to cam shaft 53 in the cylinder row direction, a circular control cam 94 eccentrically-clamped to control shaft 93, a rocker arm 95 externally fitted to control cam 94 so as to be rotatable relative thereto and with one end being coupled to an end of ring-shaped link 92, and a rod-shaped link 96 connected to the other end of rocker arm 95 and to swing cam 84.

Control shaft 93 is rotated by a motor 97 via a gear train 98.

According to the configuration described above, when cam shaft 53 rotates synchronized with the crankshaft, ring-shaped link 92 performs an approximate translation via drive cam 91, rocker arm 95 swings about the central axis of control cam 94, and swing cam 84 swings via rod-shaped link 96 to drive intake valve 24.

Moreover, by controlling motor 97 to change the rotation angle of control shaft 93, the position of the central axis of control cam 94 which becomes the swinging center of rocker arm 95, changes to change the orientation of swing cam 84.

As a result, the operating angle and the maximum valve lift amount of intake valve 24 continuously change, in a state with the center phase of the operating angle of intake valve 24 being approximately constant, and the intake valve closing timing IVC of intake valve 24 continuously changes corresponding to the change of the operating angle.

Variable operating angle mechanism 31A can be constituted such that the center phase of the operating angle also continuously changes, corresponding to the change of the operating angle and the maximum valve lift amount.

A detection signal from an angle sensor 99 that detects a rotation angle CA of control shaft 93 is input to engine controller 12, and feedback control of the manipulated variable for controlling supply power to motor 97 is performed based on a detection result of angle sensor 99, so that control shaft 93 is turned to a target angular position corresponding to a target valve lift amount.

On the other hand, as center phase variable mechanism 31B, a vane-type center phase variable mechanism described in Japanese Laid-open Patent Publication No. 2010-077813 can be adopted. Moreover, a center phase variable mechanism in which a helical spline and an electromagnetic retarder are combined, a center phase variable mechanism in which a helical spline and oil pressure are combined, or a center phase variable mechanism using an electromagnetic braking force, can be adopted. Furthermore in center phase variable mechanism 31B using oil pressure, an engine-driven oil pump or electrically-driven oil pump can be used.

Control of variable valve timing mechanism 31 by engine controller 12 in internal combustion engine 2 using variable valve timing mechanism 31 in which variable operating angle mechanism 31A and center phase variable mechanism 31B are combined will be explained following the flowchart in FIG. 10.

In the present embodiment, it is assumed that center phase variable mechanism 31B includes a lock mechanism that mechanically locks the center phase of the operating angle at an intermediate phase position adapted for at the time of startup.

Figure 10:
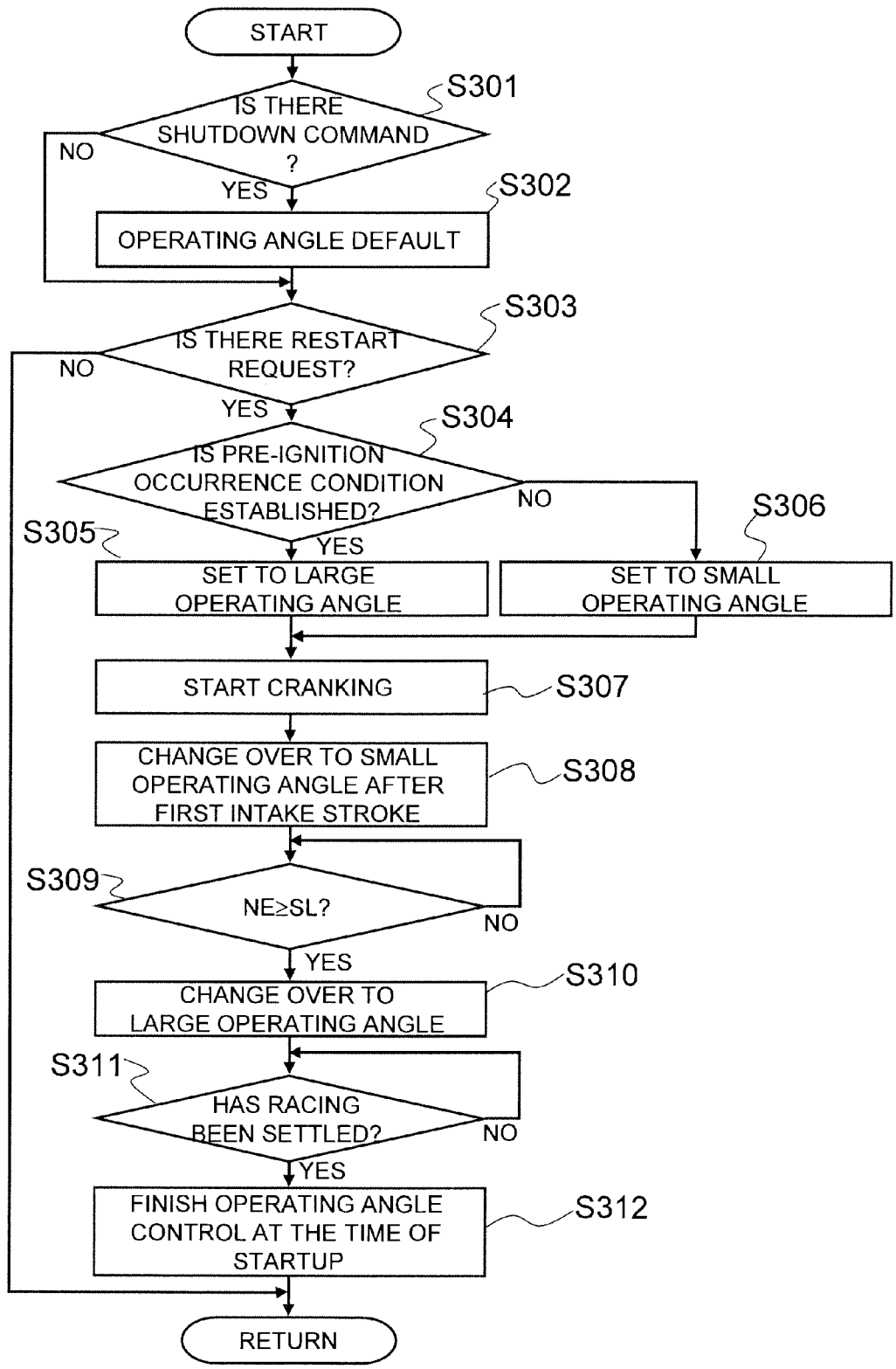
FIG. 10 is a flowchart showing control of the valve timing at the time of startup in the embodiment of the present invention.

The routine shown in the flowchart in FIG. 10 is performed at regular time intervals. At first, in step S301 it is determined whether a shutdown command of internal combustion engine 2 such as an idle reduction request has been generated, based on the operation mode. Then if a shutdown command of internal combustion engine 2 has been generated, control proceeds to step S302, in which engine controller 12 controls variable operating angle mechanism 31A to a default minimum operating angle, and locks the center phase of the operating angle of intake valve 24 to the phase position for startup by the lock mechanism of center phase variable mechanism 31B.

In step S303 it is determined whether there is a restart request such as an idle reduction release request.

Then if a restart request has been generated, control proceeds to step S304, in which it is determined whether a pre-ignition occurrence condition is established, based on the coolant water temperature TW and/or intake temperature.

In the case in which a pre-ignition occurrence condition is established, control proceeds to step S305, in which variable operating angle mechanism 31A is controlled so that the operating angle of intake valve 24 becomes a target large operating angle preset as a value suitable for suppressing pre-ignition.

The target large operating angle is set so that the intake valve closing timing IVC of intake valve 24 is in a range of, for example, from 60 degrees to 110 degrees after intake bottom dead center BDC, preferably, an intake valve closing timing IVC near 90 degrees after BDC (ABDC), in a state with the center phase of the operating angle of intake valve 24 being locked to the phase position for startup by the lock mechanism of center phase variable mechanism 31B.

On the other hand, in the case in which it is predicted that pre-ignition does not occur, control proceeds to step S306, in which variable operating angle mechanism 31A is controlled so that the operating angle of intake valve 24 becomes smaller than the target large operating angle, and the intake valve closing timing IVC approaches closer to bottom dead center BDC than the intake valve closing timing IVC with the target large operating angle, to become a target small operating angle with a high effective compression ratio.

The target small operating angle is set so that the intake valve closing timing IVC of intake valve 24 is in a range of, for example, from intake bottom dead center BDC to 30 degrees after intake bottom dead center, in a state with the center phase of the operating angle of intake valve 24 being locked to the phase position for startup by the lock mechanism of center phase variable mechanism 31B.

In step S307, electric motor 3 is started to rotate the crankshaft of internal combustion engine 2 by the output of electric motor 3, so that internal combustion engine 2 is cranked, and fuel injection to and ignition of internal combustion engine 2 are started.

When cranking of internal combustion engine 2 is started, in the intake stroke of the cylinder which goes into the intake stroke first out of all cylinders, if an occurrence of pre-ignition is predicted, the intake valve closing timing IVC of intake valve 24 is set to a large operating angle, with which the first closing timing becomes near 90 degrees after intake bottom dead center.

In the first intake stroke, the large operating angle is set so that the intake valve closing timing IVC becomes near 90 degrees after intake bottom dead center, thereby decreasing the effective compression ratio in the first intake stroke. Consequently, even under the condition in which pre-ignition tends to occur, the occurrence of pre-ignition can be suppressed.

In other words, the first intake valve closing timing IVC at which a low effective compression ratio capable of suppressing the occurrence of pre-ignition can be achieved, is set after intake bottom dead center BDC, and a target of the operating angle with which intake valve 24 is closed at the first intake valve closing timing IVC, is set as the target large operating angle, and variable operating angle mechanism 31A is controlled based on the target large operating angle.

On the other hand, in the case in which there is no pre-ignition occurrence condition, then in the first intake stroke, the intake valve closing timing IVC of intake valve 24 is closer to intake bottom dead center BDC than for the case in which there is a pre-ignition occurrence condition, and is set to a small operating angle with the effective compression ratio becoming high.

If fuel can be combusted with a high effective compression ratio from the first intake stroke, a high combustion torque can be obtained from the first explosion, rising response in engine speed NE can be quickened, and startup time can be reduced, and furthermore, battery power required for startup can be saved.

In step S308, in the first intake stroke, in the case in which the intake valve closing timing IVC of intake valve 24 is set to the large operating angle near 90 degrees after intake bottom dead center, then after completion of the first intake stroke, more specifically, after the intake valve closing timing IVC of intake valve 24 of the cylinder which goes into the intake stroke first out of all cylinders, variable operating angle mechanism 31A is controlled so that the angle is changed to a small operating angle with which the intake valve closing timing IVC of intake valve 24 becomes the intake valve closing timing IVC closer to intake bottom dead center BDC.

Here, because the center phase of the operating angle of intake valve 24 is constant, then if the operating angle is changed to a small angle, the intake valve opening timing IVO is retarded, the intake valve closing timing IVC is advanced, and the intake valve closing timing IVC approaches intake bottom dead center.

As a result, the intake valve closing timing IVC approaches closer to intake bottom dead center BDC than in the first intake stroke, from the intake stroke of a cylinder which goes into the intake stroke second out of all cylinders, and fuel can be combusted with a higher effective compression ratio. Consequently, high combustion torque can be obtained in the second intake stroke and thereafter, while the occurrence of pre-ignition is suppressed, and the rising response in engine speed NE can be quickened, thereby enabling to reduce the startup time, and furthermore, save the battery power required for startup.

In the case in which the operating angle made variable by variable operating angle mechanism 31A is set to the target small operating angle with which the intake valve closing timing IVC becomes intake bottom dead center or immediately after intake bottom dead center, then as described above, the increase in the rotation speed is accelerated by an increase in the combustion torque due to an increase in the effective compression ratio. However, if the increase in the rotation speed is accelerated, overshoot may increase.

Accordingly, the following process is performed for suppressing overshoot of the engine speed. In step S309 it is determined whether the engine speed NE is equal to or higher than the complete explosion determination speed SL.

The complete-explosion determination speed SL is a rotation speed at which it can be determined that internal combustion engine 2 can continue rotation independently even if cranking of internal combustion engine 2 by electric motor 3 is stopped, and for example, it is set to approximately 1000 rpm.

If the engine speed NE has reached the complete explosion determination speed SL, cranking of internal combustion engine 2 by electric motor 3 is not required. Moreover, if the operating angle which becomes the second intake valve closing timing IVC near bottom dead center having a high effective compression ratio is continuously used, overshoot with respect to a target idling rotation speed of the engine speed NE may become excessive.

Consequently, when the engine speed NE reaches the complete explosion determination speed SL in a state with the angle controlled to the target small operating angle, control proceeds to step S310, in which cranking of internal combustion engine 2 by electric motor 3 is stopped, and the operating angle made variable by variable operating angle mechanism 31A is controlled to the target large operating angle.

With the target large operating angle, the intake valve closing timing IVC of intake valve 24 is retarded after intake bottom dead center to decrease the effective compression ratio, thereby enabling to suppress overshoot of the engine speed NE.

In step S311 it is determined whether racing of the engine speed NE has been settled by changing the operating angle to the target large operating angle.

Then if determined that racing of the engine speed NE has been settled, control proceeds to step S312, in which operating angle control for startup is finished, and the target operating angle is set based on the engine operation conditions such as engine load and engine speed, thereby controlling variable operating angle mechanism 31A according to the set target operating angle. Moreover, the lock state of the lock mechanism of center phase variable mechanism 31B is released, and a target center phase is set based on the engine operation conditions such as engine load and engine speed, to control center phase variable mechanism 31B according to the target center phase.

In the embodiment described above, the operating angle and the intake valve closing timing IVC of intake valve 24 are changed by variable operating angle mechanism 31A at the time of startup. However, the center phase can be changed by center phase variable mechanism 31B concurrently with the change of the operating angle by variable operating angle mechanism 31A, thereby enabling to control the intake valve closing timing IVC of intake valve 24 at the time of startup. Moreover, when variable operating angle mechanism 31A is not provided, and an electrically-driven center phase variable mechanism 31B having comparatively fast response is provided, center phase variable mechanism 31B can control the intake valve closing timing IVC of intake valve 24 at the time of startup.

However, in the case of the mechanism that continuously changes the operating angle or the center phase of the operating angle, changeover response of the controlled variable is slow, and it is difficult to use the large operating angle in the first intake stroke and change over to a smaller target operating angle with good response from the second intake stroke and thereafter. In contrast, if a mechanism that changes over the cam to either small operating angle cam 54 or large operating angle cam 55 is used, control to respective target operating angles in the first intake stroke and the second intake stroke is possible. As a result, suppression of pre-ignition and improvement of rising response in engine speed NE can be balanced well.

Moreover, in internal combustion engine 2 using variable valve timing mechanism 31 in which variable operating angle mechanism 31A and center phase variable mechanism 31B are combined, in the case in which center phase variable mechanism 31B can change the center phase in an engine shutdown state or in a low rotation area such as cranking, the intake valve closing timing IVC of intake valve 24 in the intake stroke of a cylinder which goes into the intake stroke first out of all cylinders, and the intake valve closing timing IVC of intake valve 24 in the intake stroke of a cylinder corresponding to the second intake stroke since the beginning of startup, can be controlled by changing the center phase by center phase variable mechanism 31B.

The entire contents of Japanese Patent Application No. 2010-210923, filed Sep. 21, 2010, are incorporated herein by reference.

While only a select embodiment have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as claimed in the appended claims and their equivalents.

What is claimed is:

1. An apparatus for controlling a variable valve timing mechanism that changes a closing timing of an intake valve of an internal combustion engine, comprising:
   a first control unit configured to control the closing timing of the intake valve in an intake stroke of a first cylinder of a plurality of cylinders, which first cylinder goes into the intake stroke first of the plurality of cylinders at a time of startup of the internal combustion engine, so as to be a first closing timing on a retardation side from an intake bottom dead center; and a second control unit configured to change the closing timing of the intake valve to a second closing timing at which the intake valve is closer to the intake bottom dead center than at the first closing timing, from after the time of startup of the internal combustion engine until the closing timing of the intake valve in a second intake stroke for another cylinder of the plurality of cylinders.

2. An apparatus for controlling a variable valve timing mechanism according to claim 1, further comprising:
a third control unit that, when after the time of startup of the internal combustion engine, a rotation speed of the internal combustion engine becomes greater than a threshold, is configured to change the closing timing of the intake valve from the second closing timing to the first closing timing.

3. An apparatus for controlling a variable valve timing mechanism according to claim 1, further comprising:
a determining unit configured to determine whether or not there is a condition where pre-ignition is occurring; and
a fourth control unit that, when there is no condition where pre-ignition is occurring, is configured to control the closing timing of the intake valve in the intake stroke of the first cylinder to be the second closing timing,
wherein the first control unit and the second control unit are configured to control the closing timing of the intake valve when there is the condition where pre-ignition is occurring.

4. An apparatus for controlling a variable valve timing mechanism according to claim 3, wherein the determining unit is configured to determine whether or not there is the condition where pre-ignition is occurring, based on at least one of a temperature of coolant of the internal combustion engine, and a temperature of intake air of the internal combustion engine.

5. An apparatus for controlling a variable valve timing mechanism according to claim 1, further comprising a fuel injection control unit configured to perform a first fuel injection to a cylinder of the plurality of cylinders which has stopped in a middle of an intake stroke in a stop condition of the internal combustion engine at the time of startup of the internal combustion engine.

6. An apparatus for controlling a variable valve timing mechanism according to claim 1, wherein the second control unit is configured to set the second closing timing to a timing at which an effective compression ratio of the internal combustion engine becomes a maximum.

7. An apparatus for controlling a variable valve timing mechanism according to claim 1, wherein the second control unit is configured to set the second closing timing to a timing between after the intake bottom dead center and the first closing timing.

8. An apparatus for controlling a variable valve timing mechanism according to claim 1, wherein the first control unit is configured to control the closing timing of the intake valve to the first closing timing, at a time of shutdown of the internal combustion engine, to thereby control the closing timing of the intake valve in the intake stroke of the first cylinder, to be the first closing timing.

9. An apparatus for controlling a variable valve timing mechanism according to claim 1,
wherein the internal combustion engine comprises a power source together with an electric motor in a hybrid vehicle, and
the startup of the internal combustion engine is performed based on a start command by an operation mode in the hybrid vehicle.

10. An apparatus for controlling a variable valve timing mechanism according to claim 1, wherein
the variable valve timing mechanism is a mechanism that changes over between two types of cam for which an operating angle of the intake valve is different, by rotating a control shaft by a motor, and
the closing timing of the intake valve when the intake valve is driven by a first cam for which the operating angle is greater out of the two types of cam is the first closing timing, and
the closing timing of the intake valve when the intake valve is driven by a second cam for which the operating angle is smaller out of the two types of cam is the second closing timing.

11. An apparatus for controlling a variable valve timing mechanism according to claim 1, wherein
the variable valve timing mechanism includes:
a variable operating angle mechanism that continuously changes an operating angle of the intake valve and a maximum valve lift amount, by rotating a control shaft by a motor; and
a center phase variable mechanism that continuously changes a center phase of an operating angle of the intake valve, by changing a rotation phase of a cam shaft with respect to a crankshaft,
the center phase variable mechanism includes a lock mechanism that locks a center phase of an operating angle of the intake valve at a phase for when starting,
the first control unit, in a state in which the center phase of the operating angle of the intake valve is locked by the lock mechanism at a phase for when starting, is configured to control the variable operating angle mechanism so that a closing timing of the intake valve becomes an operating angle for the first closing timing, and
the second control unit, in a state in which the center phase of the operating angle of the intake valve is locked by the lock mechanism at a phase for when starting, is configured to control the variable operating angle mechanism so that the closing timing of the intake valve becomes an operating angle for the second closing timing.

12. An apparatus for controlling a variable valve timing mechanism according to claim 1, wherein in a case in which the internal combustion engine is restarted from idle reduction, the first control unit and the second control unit are configured to control the closing timing of the intake valve.

13. An apparatus for controlling a variable valve timing mechanism that changes a closing timing of an intake valve of an internal combustion engine, comprising:
a first control device configured to control the closing timing of the intake valve in an intake stroke of a first cylinder of a plurality of cylinders, which first cylinder goes into the intake stroke at a time of startup of the internal combustion engine, to be a first closing timing on a retardation side from an intake bottom dead center; and
a second control device configured to change the closing timing of the intake valve to be a second closing timing at which the intake valve is closer to the intake bottom dead center than at the first closing timing, from after the time of startup of the internal combustion engine until the closing timing of the intake valve in a second intake stroke for another cylinder of the plurality of cylinders.

14. A method of controlling a variable valve timing mechanism that changes a closing timing of an intake valve of an internal combustion engine, comprising:
controlling closing timing of the intake valve in an intake stroke of a first cylinder of a plurality of cylinders, which first cylinder goes into the intake stroke at a time of startup of the internal combustion engine, to a first closing timing on a retardation side from an intake bottom dead center; and changing the closing timing of the intake valve to a second closing timing at which the intake valve is closer to the intake bottom dead center than at the first closing timing, from after the time of startup of the internal combustion engine until the closing timing of the intake valve in a second intake stroke for another cylinder of the plurality of cylinders.

15. A method of controlling a variable valve timing mechanism according to claim 14, further comprising:

determining after the startup of the internal combustion engine, whether or not a rotation speed of the internal combustion engine has become greater than a threshold; and changing the closing timing of the intake valve from the second closing timing to the first closing timing, in a case in which the rotation speed of the internal combustion engine has become greater than the threshold.

16. A method of controlling a variable valve timing mechanism according to claim 14, further comprising:

determining whether or not there is a condition where pre-ignition is occurring; and when there is no condition where pre-ignition is occurring, controlling the closing timing of the intake valve in the intake stroke of the first cylinder to be the second closing timing.

17. A method of controlling a variable valve timing mechanism according to claim 14, further comprising:

performing a first fuel injection to a cylinder of the plurality of cylinders which has stopped in a middle of an intake stroke, in a stop condition of the internal combustion engine, at the time of startup of the internal combustion engine.

18. A method of controlling a variable valve timing mechanism according to claim 14, wherein the controlling to the first closing timing includes:

controlling the closing timing of the intake valve beforehand so as to be the first closing timing, at a time of shutdown of the internal combustion engine.

19. A method of controlling a variable valve timing mechanism according to claim 14, wherein the variable valve timing mechanism is a mechanism that changes over between two types of cam for which an operating angle of the intake valve is different, by rotating a control shaft by a motor, the controlling to the first closing timing includes setting the closing timing of the intake valve to be the first closing timing, by driving the intake valve by a first cam for which the operating angle is greater out of the two types of cam, and controlling to the second closing timing includes setting the closing timing of the intake valve to be the second closing timing, by driving the intake valve by a second cam for which the operating angle is smaller out of the two types of cam.

20. A method of controlling a variable valve timing mechanism according to claim 14, wherein the variable valve timing mechanism includes:

a variable operating angle mechanism that continuously changes an operating angle of the intake valve and a maximum valve lift amount, by rotating a control shaft by a motor; and a center phase variable mechanism that continuously changes a center phase of an operating angle of the intake valve, by changing a rotation phase of a cam shaft with respect to a crankshaft, the center phase variable mechanism includes a lock mechanism that locks a center phase of an operating angle of the intake valve at a phase for when starting, the controlling to the first closing timing includes, in a state in which the center phase of the operating angle of the intake valve is locked by the lock mechanism at a phase for starting, controlling the variable operating angle mechanism so that a closing timing of the intake valve becomes an operating angle for the first closing timing, and the controlling to the second closing timing includes, in a state in which the center phase of the operating angle of the intake valve is locked by the lock mechanism at a phase for starting, controlling the variable operating angle mechanism so that the closing timing of the intake valve becomes an operating angle for the second closing timing.

* * * * *